United States Patent [19]
Veldkamp et al.

[11] Patent Number: 6,125,991
[45] Date of Patent: Oct. 3, 2000

[54] CONVEYOR CHAIN AND SYSTEM FOR LOOPED SAUSAGE PRODUCTS

[75] Inventors: Brent Michael Veldkamp, Des Moines; David Hamblin, Norwalk; Kenneth Lebsack, Ankeny, all of Iowa

[73] Assignee: Townsend Engineering Company, Des Moines, Iowa

[21] Appl. No.: 09/050,809

[22] Filed: Mar. 30, 1998

[51] Int. Cl.$^7$ ................................................. B65G 17/20
[52] U.S. Cl. .......................................... 198/678.1; 198/681
[58] Field of Search ................................ 198/678.1, 681, 198/687.1, 817, 339.1

[56] References Cited

U.S. PATENT DOCUMENTS

4,532,858  8/1985  Herschfeld ........................... 99/534 X

*Primary Examiner*—Christopher P. Ellis
*Assistant Examiner*—Gene O. Crawford
*Attorney, Agent, or Firm*—Zarley, McKee, Thomte, Voorhees & Sease

[57] ABSTRACT

A conveyor chain for linked sausages has a plurality of spaced first hook carriers with second hook carriers pivotally secured thereto between pairs of the first hook carriers. A generally J-shaped hook having an elongated shank is secured to each of the first and second hook carriers by one of the ends of the shank. A roller bearing is rotatably mounted on that end of the shank on only the shanks depending from the second hook carriers. The roller bearings engage teeth on a sprocket wheel spaced to operatively drivingly engage only the shanks depending from the second hook carriers. The conveyor chain is continuous in nature and movably extends through an enclosed smoke compartment for subjecting the loops of linked sausages to the smoke material, either of a liquid nature, or natural smoke. The compartment has a series of spaced rotatable members, some of which are sprockets which engage and drive the chain, and others which are rotatable members having a circular bearing surface extending therearound to engage laterally extending bars on the chain opposite to the hook members. The sprocket members are disposed in a horizontal plane and the rotatable members with the bearing surfaces are disposed in a vertical plane.

21 Claims, 11 Drawing Sheets

CONVEYOR CHAIN AND SYSTEM FOR LOOPED SAUSAGE PRODUCTS

BACKGROUND OF THE INVENTION

Elongated strands of looped sausage links are typically subjected to liquid or natural smoke after being formed on a sausage making machine. The smoke environment is intended to impart flavor to the sausage. See such a machine disclosed in U.S. Pat. No. 4,532,858. The sausage strand is draped over hooks on a conveyor which is rotated through a smoke compartment where a spray of liquid smoke, or natural smoke, is present. The conveyor includes a continuous conveyor chain which moves through the compartment in more than one plane.

The problem with the existing conveyor chains is that the hooks thereon are substantially spaced to accommodate the turns in the circuitous path of the chain as it moved through the housing, thus decreasing the product density of the system. Further, it is not readily possible to position the hooks closer together because this would not allow the chain to easily follow a dual plane path within the confines of the housing.

It is therefore a principal object of this invention to provide a conveyor chain and system for looped sausage products which will increase the density (volume) of sausage links, and at the same time, permit the conveyor to easily move through a circuitous dual-plane path within the smoke compartment.

These and other objects will be apparent to those skilled in the art.

SUMMARY OF THE INVENTION

A conveyor chain for linked sausages has a plurality of spaced first hook carriers with second hook carriers pivotally secured thereto between pairs of the first hook carriers. A generally J-shaped hook having an elongated shank is secured to each of the first and second hook carriers by one of the ends of the shank. A roller bearing is rotatable mounted on that end of the shank on only the shanks depending from the second hook carriers. The roller bearings engage teeth on a sprocket wheel spaced to operatively drivingly engage only the shanks depending from the second hook carriers.

The conveyor chain is continuous in nature and movably extends through an enclosed smoke compartment for subjecting the loops of linked sausages to the smoke material, either of a liquid nature, or natural smoke. The compartment has a series of spaced rotatable members, some of which are sprockets which engage and drive the chain, and others which are rotatable members having a circular bearing surface extending therearound to engage laterally extending bars on the chain opposite to the hook members. The sprocket members are disposed in a horizontal plane and the rotatable members with the bearing surfaces are disposed in a vertical plane.

DESCRIPTION OF THE PREFERRED EMBODIMENT

Figures 13, 14:
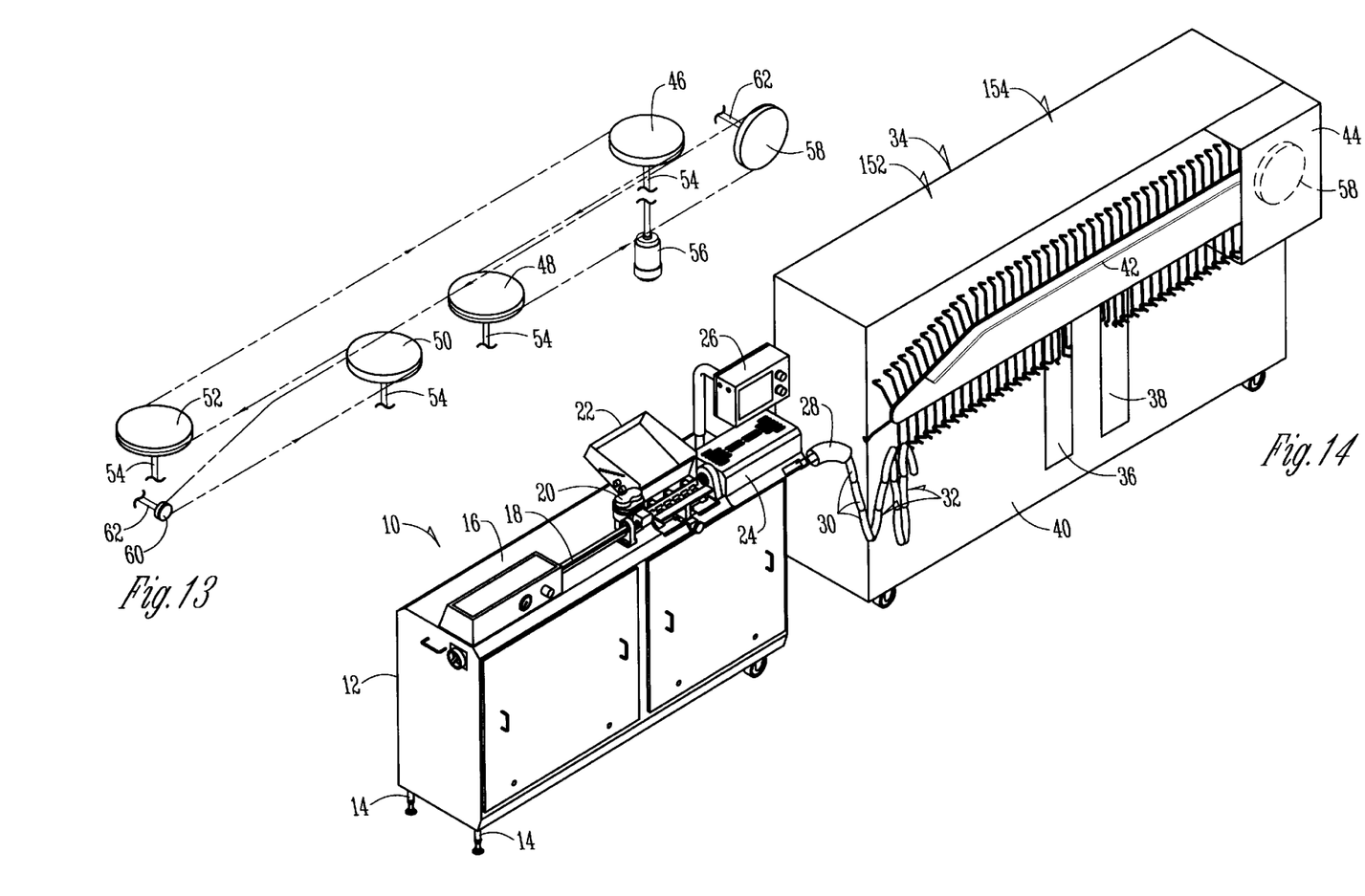
FIG. 13 is a schematic perspective view showing the rotatable members used in this invention.
FIG. 14 is perspective view of a sausage making machine and the smoke compartment which houses the conveyor system of this invention.

With reference to FIG. 14, a conventional sausage making machine 10 has a frame 12 with four supporting legs 14. The top 16 of frame 12 supports a conventional stuffing tube 18, a meat emulsion pump 20, a casing hopper 22, a linker housing 24 which houses a conventional linker (not shown), a computer control 26, and a conventional discharge horn 28. Links of sausage 30 formed into loops 32 are shown being conventionally discharged from horn 28. The foregoing structure is conventional and does not, per se, constitute a part of this invention.

A conventional smoke compartment 34 has an entry door 36 and an exit door 38. The entry and exit doors 36 and 38 are located in sidewall 40. A substantially horizontal chain guide 42 is affixed to sidewall 40 as is a chain shield 44. With reference to FIG. 13, sprocket wheels 46, 48, 50 and 52 are identical and are mounted in a horizontal plane on vertical shafts 54 in any convenient manner. These sprocket wheels 46–52 are mounted within smoke compartment 34. An electric gear motor 56 is operatively connected to sprocket 46 and is adapted to rotate sprocket 46 in conventional fashion.

Pulleys 58 and 60 are mounted on horizontal shafts 62 on the outside of sidewall 40 with the sprocket 58 dwelling within shield 44.

Figure 8:
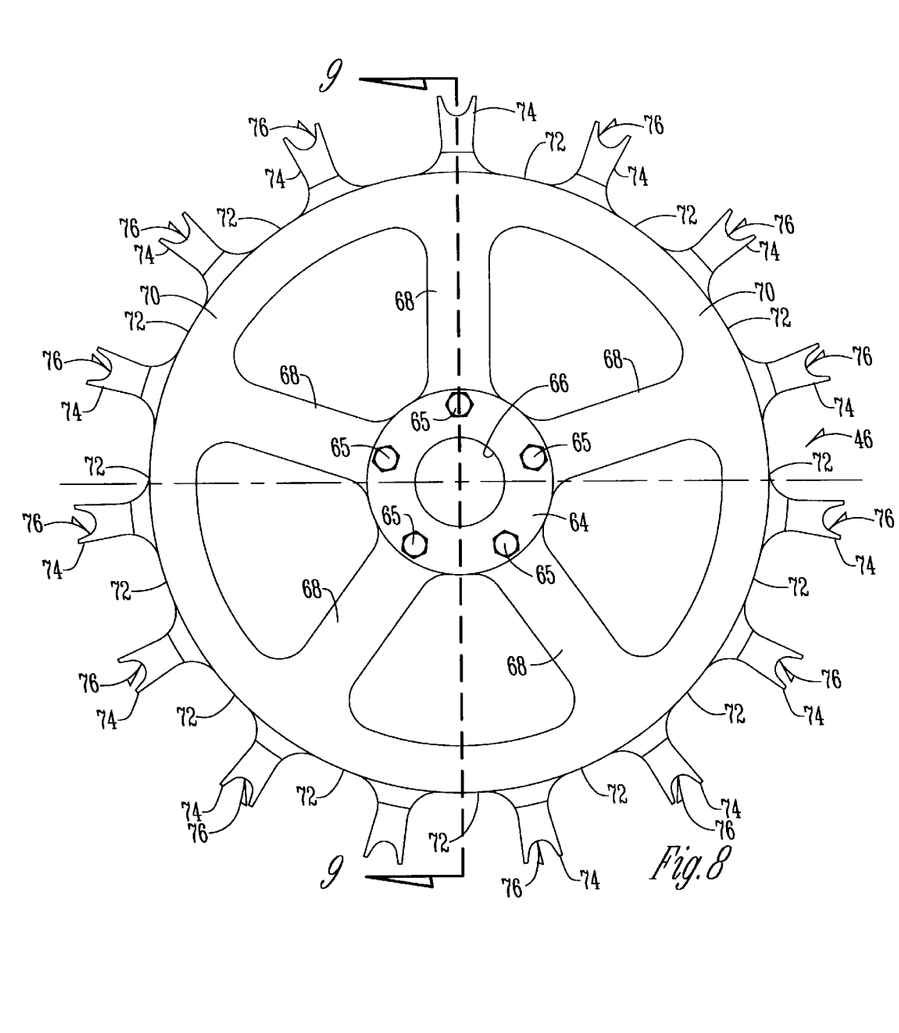
FIG. 8 is a plan view of the sprocket used in conjunction with the chain of FIGS. 4–7.
Figure 9:
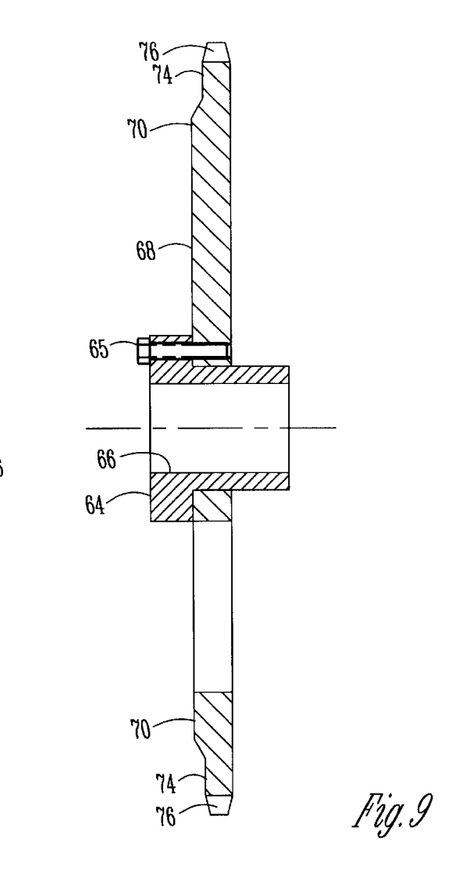
FIG. 9 is a sectional view taken on line 9—9 of FIG. 8.
Figure 10:
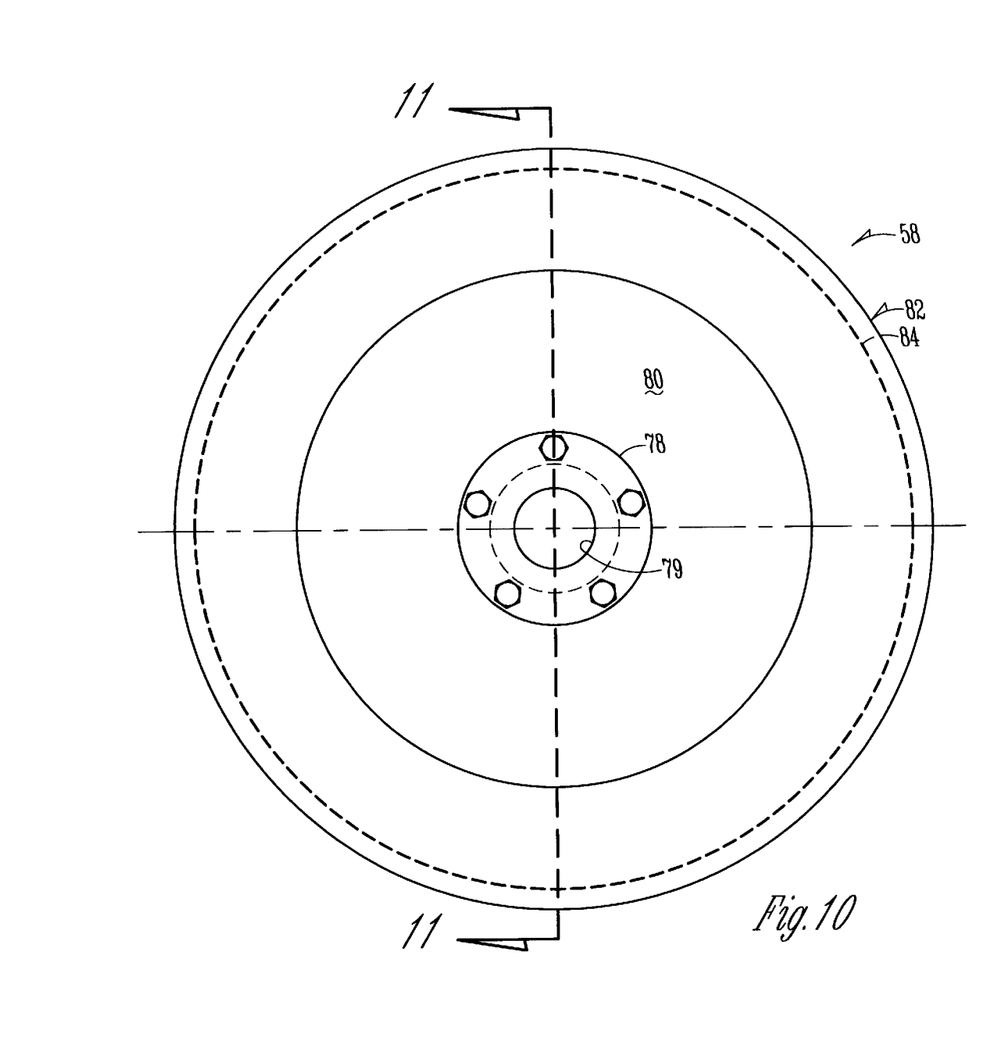
FIG. 10 is a plan view of a rotatable member forming a part of the support mechanism for the chain of FIGS. 4–7.
Figure 11:
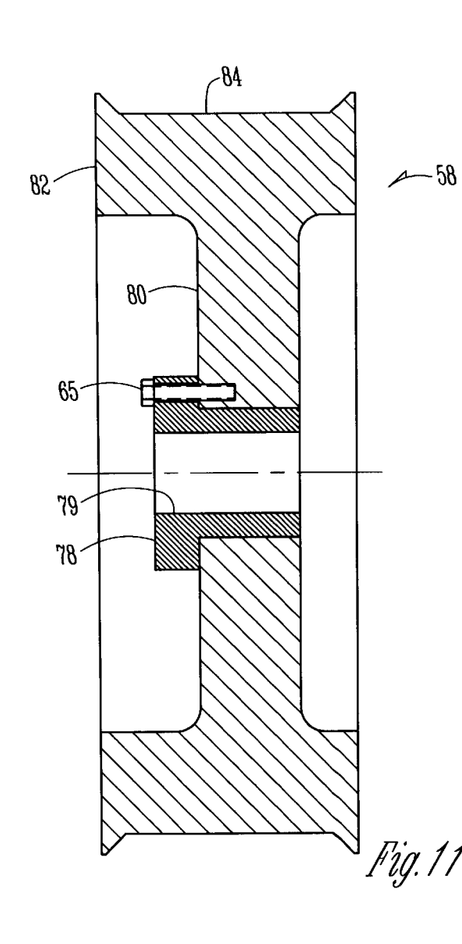
FIG. 11 is a sectional view taken on line 11—11 of FIG. 10.
Figure 12:
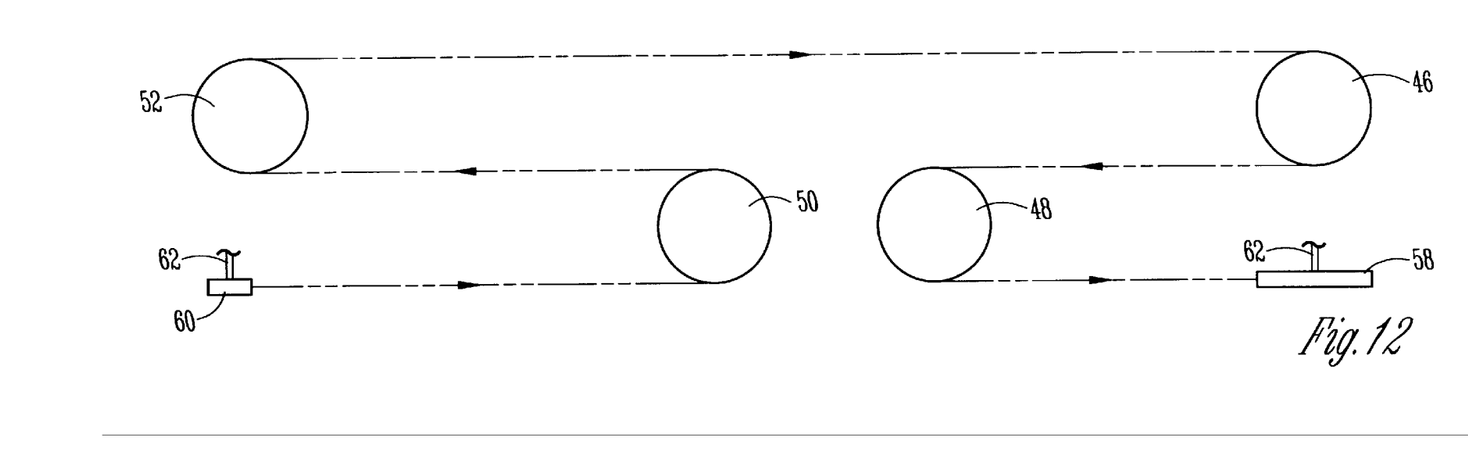
FIG. 12 is a schematic plan view of a portion of the conveyor system of this invention.

With reference to FIGS. 8 and 9, which specifically shows sprocket 46 which is identical to sprockets 48–52, a hub 64 is located in the center thereof and is secured to a center opening in the sprocket by a connecting bolt 65. Hub 64 has a center bore 66 and a plurality of arms 68 extending radially outwardly therefrom. The arms 68 terminate in a circular rim portion 70 which has an outer surface 72. A plurality of teeth 74 extend radially outwardly from the outer surface 72 (FIG. 8) and terminate in a U-shaped notch 76. As shown in FIG. 13, all four of the identical sprockets 46–52 are in a horizontal plane and are in the same plane with each other. The rotatable member 58 is shown in FIGS. 10 and 11 and is similar to the member 60 except that the diameter of member 58 is greater than the diameter of the member 60. The member 58 has a hub 78 with a center bore 79 adapted to receive horizontal shaft 62 (FIG. 13). A center web 80 extends outwardly from hub 78 and terminates in a rim 82 which has a flat circular bearing surface 84.

Figure 1:
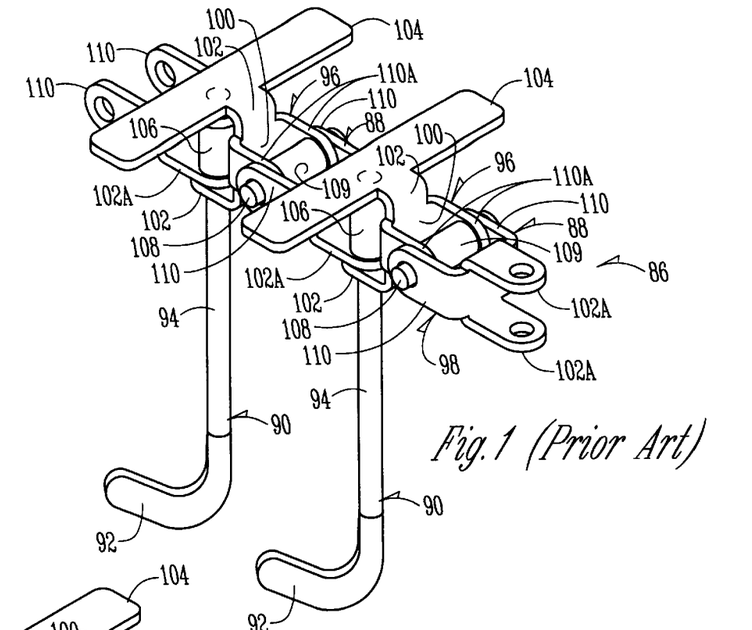
FIG. 1 is a perspective view of a prior art conveyor chain.
Figure 1A:
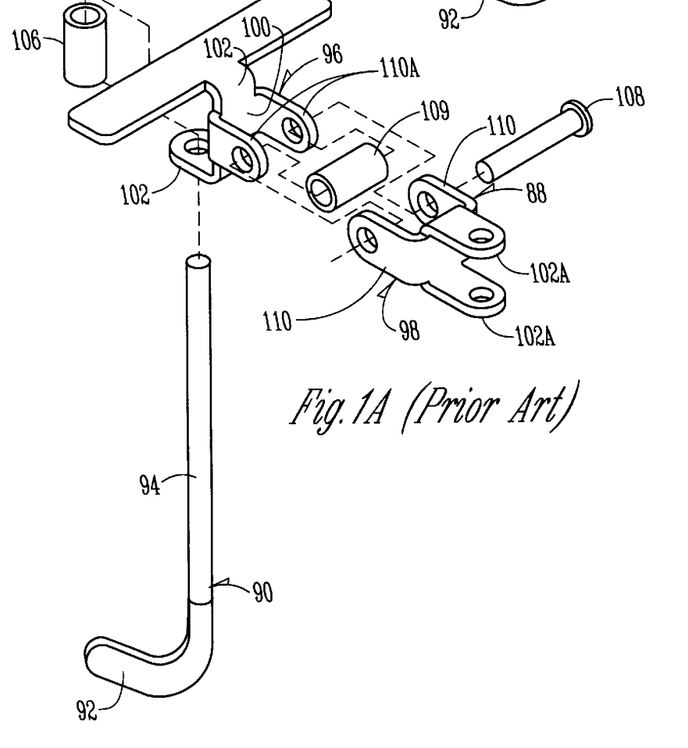
FIG. 1A is an exploded view of one of the hook assemblies of FIG. 1.
Figure 1B:
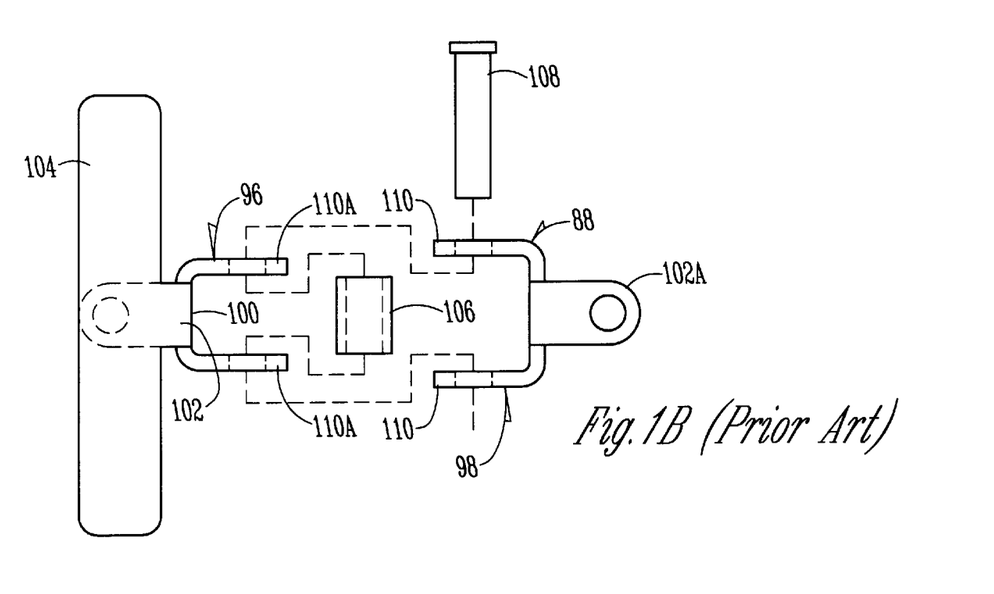
FIG. 1B is an exploded top plan view of the assembly of FIG. 1A.
Figure 1C:
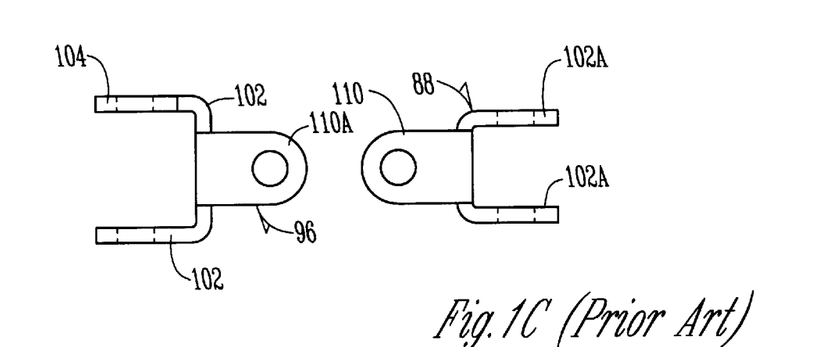
FIG. 1C is an exploded side elevational view of the hook assembly of 1B as seen from the bottom thereof.
Figure 2:
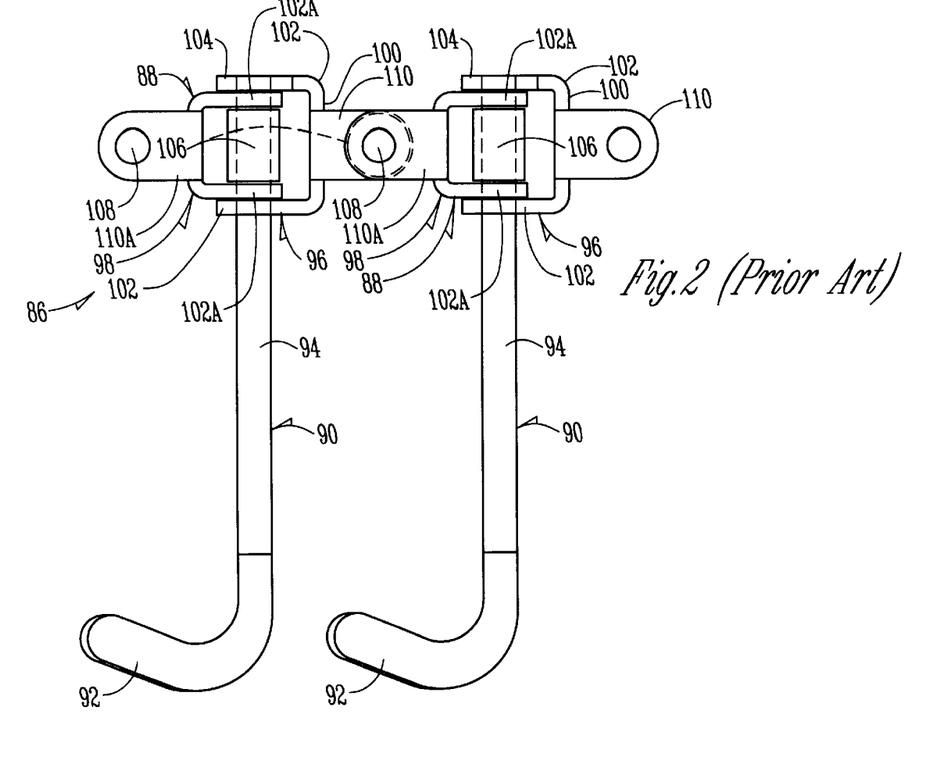
FIG. 2 is a side elevational view of the prior art chain of FIG. 1.
Figure 3:
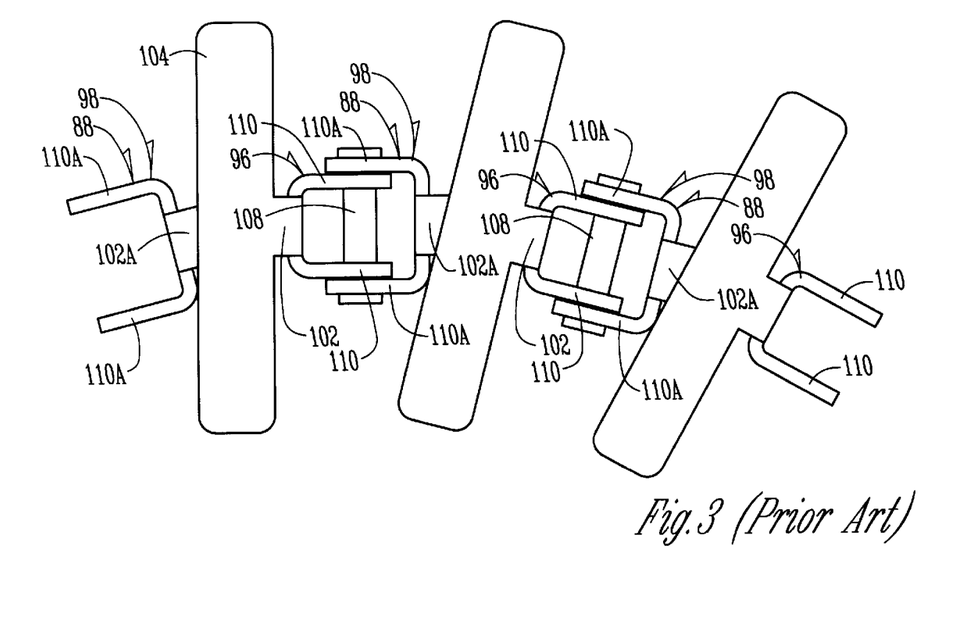
FIG. 3 is a top plan view of the type of prior art chain shown in FIGS. 1 and 2.

With reference to FIGS. 1–3, a conventional prior art chain 86 is shown which includes a hook carrier 88. The carrier 88 includes a J-shaped hook 90 which has a J-shaped portion 92 at its lower end. An elongated shank 94 extends from the J-shaped portion 92 upwardly towards the hook carrier 88. With particular reference to FIGS. 1, 1A, 1B, and 1C, the carrier 88 has two components: a small clevice 96 and a larger clevice 98. Each clevice has a vertical base or wall 100. Each clevice 96 and 98 has a pair of horizontally disposed tabs 102 and 102A, respectively, extending horizontally outwardly from the base wall 100. A flat bar 104 extends laterally outwardly from the upper tab 102 on member 96. The upper end of hook shank 94 extends upwardly through an aperture in the lower tab 102 and terminates by swedging or the like at the center of bar 104. As seen in FIG. 1, a rotatable bearing 106 is mounted on the upper end of shank 94 in the space between the lower tab 102A and the bar 104.

A pin 108 (with bushing 109 thereon) pivotally connects spaced tabs 110 and 110A. Those tabs are vertically disposed and extend outwardly from base walls 100 of members 96 and 98 in a direction towards each other. Tabs 102A are received between the tabs 110 of member 96. Again, pin 108 extends through registering apertures in the tabs 110 and 110A to pivotally secure the members 96 and 98 together.

While the prior art structure of FIGS. 1 through 3 is usable, the substantial space between the shanks 94, as caused by the members 96 and 98, substantially reduces the number of loops of sausage that can be carried by the chain 88.

Figures 4, 4A:
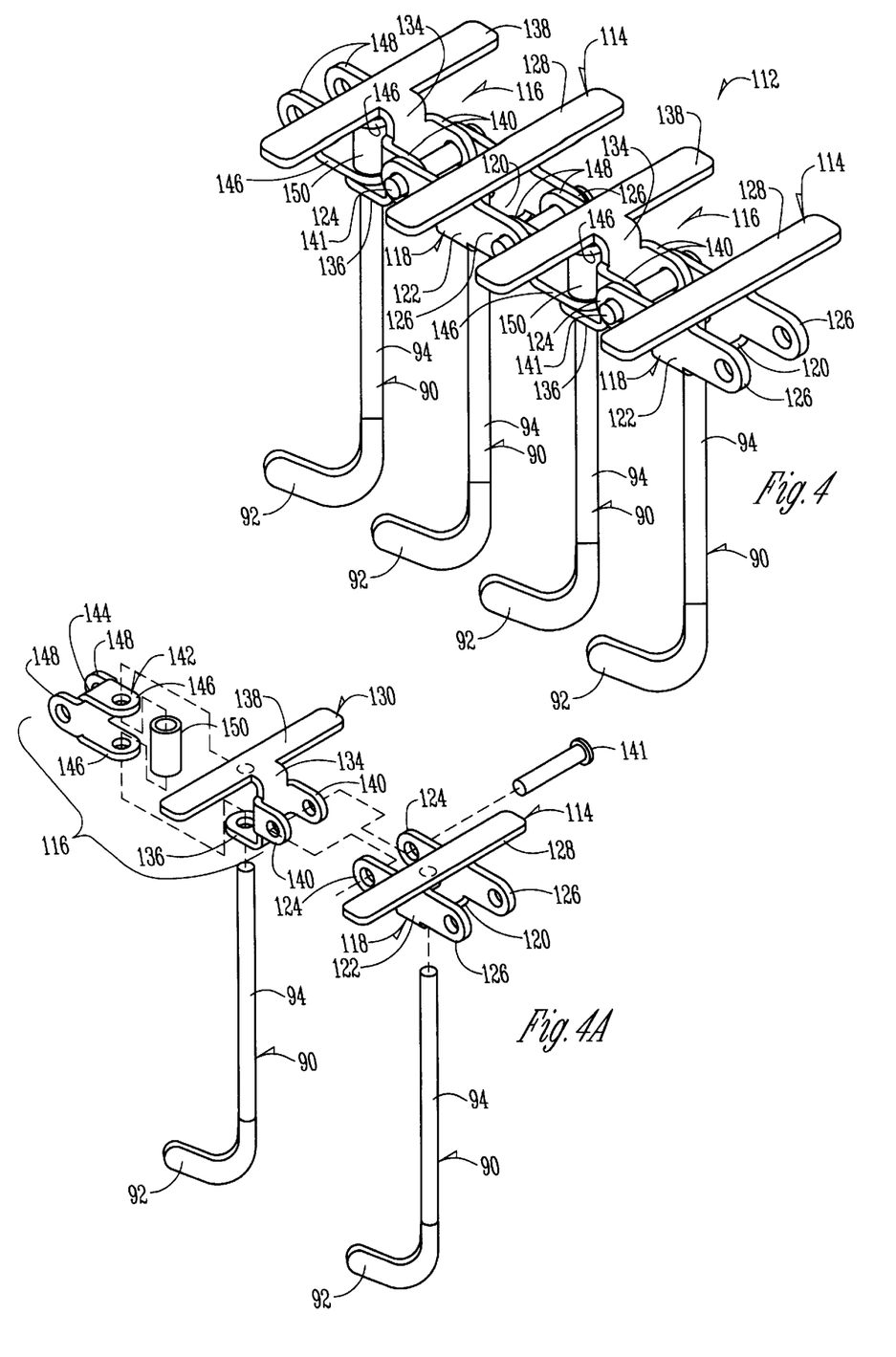
FIG. 4 is perspective view of the conveyor chain of this invention.
FIG. 4A is an exploded perspective view of one of the hook assemblies of FIG. 4.
Figure 4B:
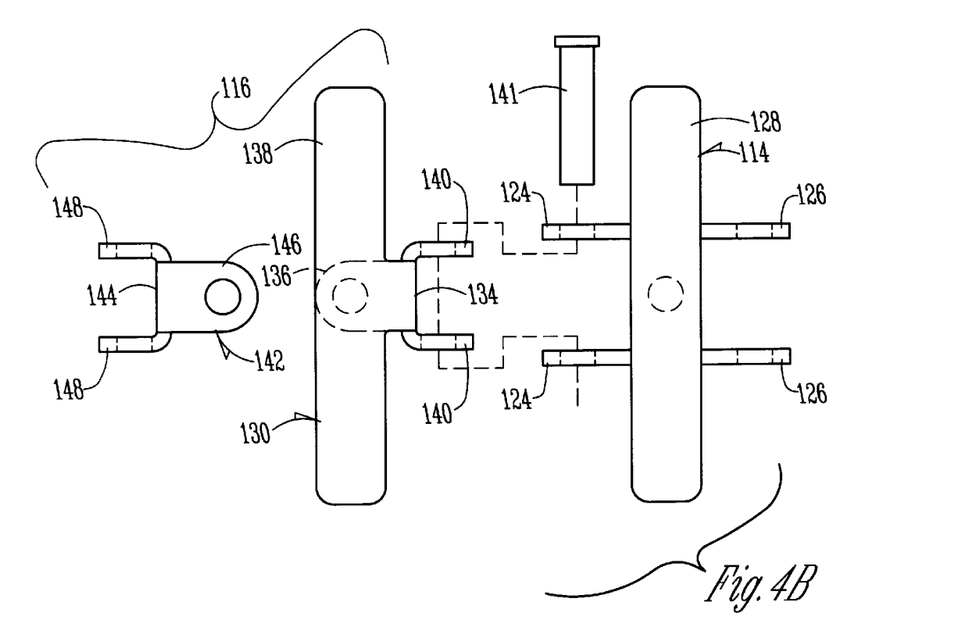
FIG. 4B is an exploded top plan view of the hook assembly of FIG. 4A.

The chain system of this invention is thus shown in FIGS. 4–7. With reference to FIG. 4, the chain 112 is comprised of a first hook carrier 114 and a second hook carrier 116. The hook carrier 114 includes a U-shaped bracket 118 having a bottom 120 and sides 122. A pair of vertically disposed tabs 124 extend longitudinally outwardly from one side of walls 122. A similar pair of tabs 126 are also disposed in a vertical plane and extend outwardly in a direction opposite to tabs 124. A cross bar 128 is rigidly secured to the upper ends of sidewalls 122 and extends in a lateral direction from bracket 118.

Figure 4C:
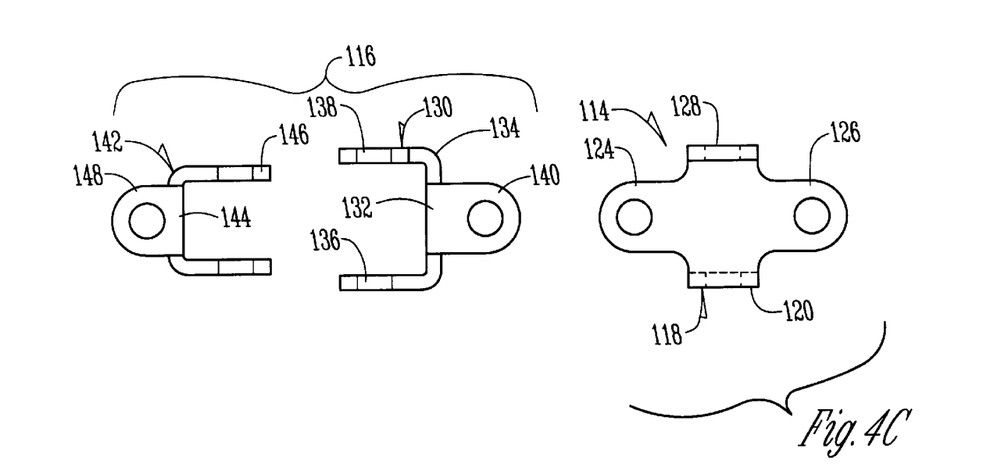
FIG. 4C is an exploded side elevational view of the hook assembly of 4B as seen from the bottom thereof.
Figure 5:
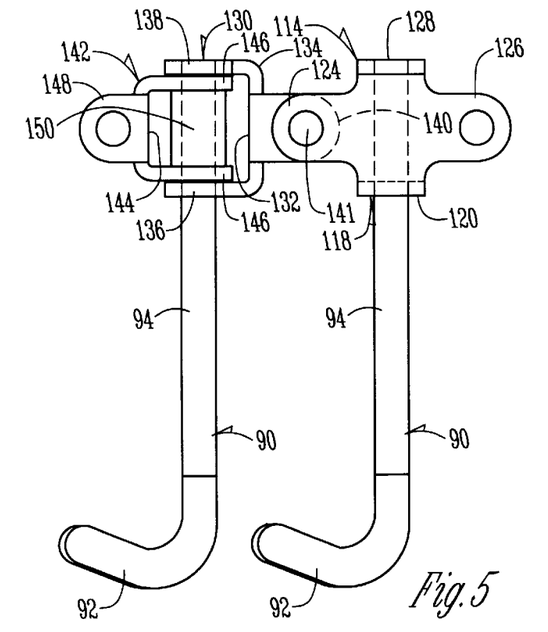
FIG. 5 is a side elevational view of a portion of the chain shown in FIG. 4.
Figure 6:
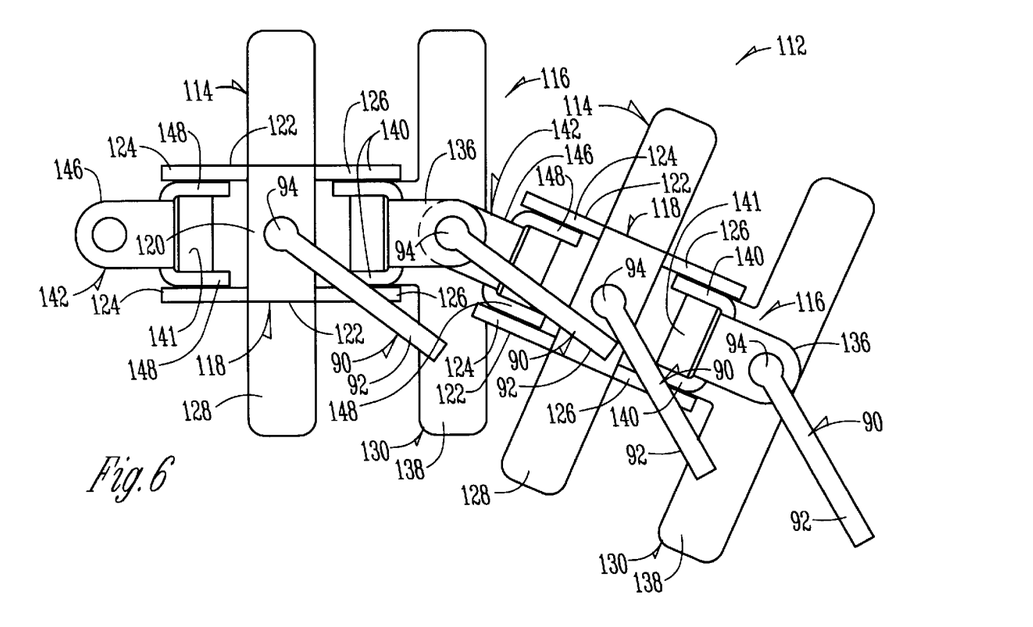
FIG. 6 is bottom plan view of the chain shown in FIG. 4 disposed in an arcuate position.
Figure 6A:
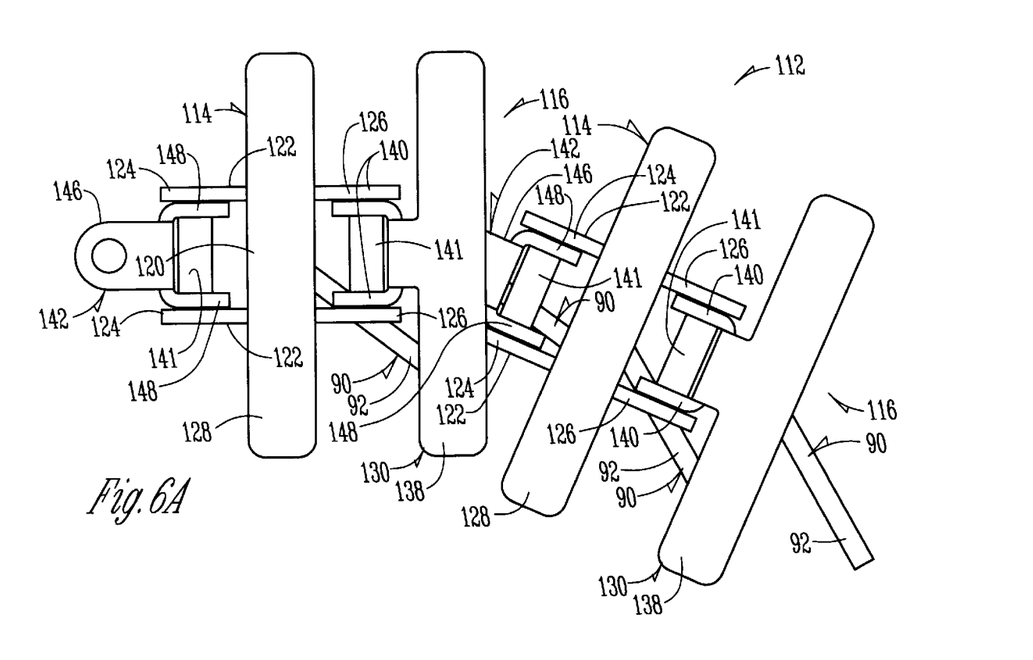
FIG. 6A is a top plan view of the chain shown in FIG. 4 disposed in an arcuate position.
Figure 7:
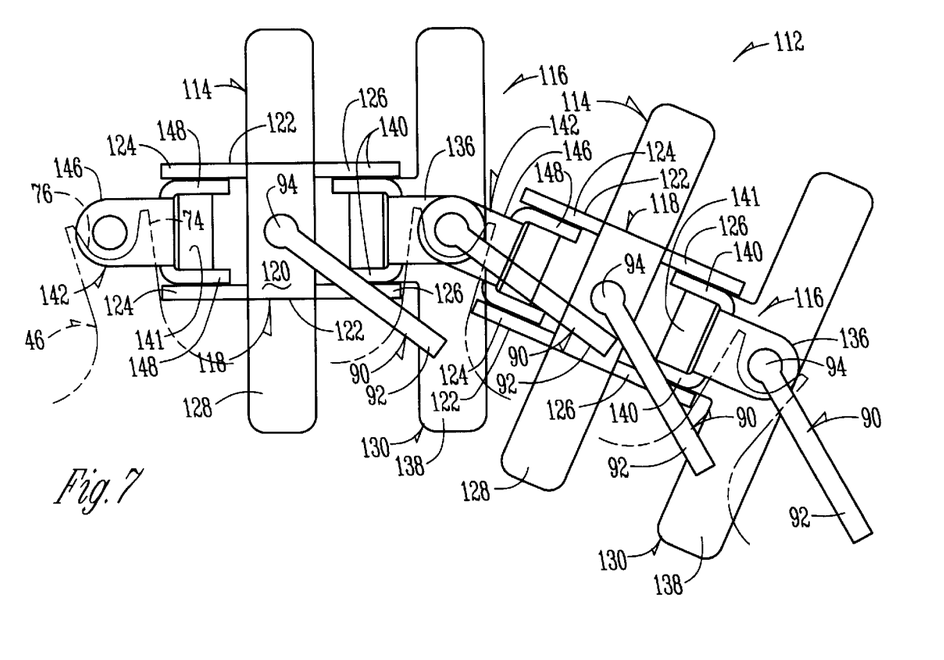
FIG. 7 is a bottom plan view similar to FIG. 6 wherein the teeth of a sprocket are shown in dotted lines.

A C-shaped clevice 130 (FIG. 4C) has a vertical base wall 132 with horizontally disposed upper tabs 134 and 136 extending outwardly from wall 132. A horizontal cross bar 138 extends laterally outwardly from tab 134. Cross bar 138 is essentially identical to cross bar 128. A pair of tabs 140 dwell in a vertical plane and extend towards the tabs 126 of member 114. Tabs 140 are pivotally fitted within the tabs 124 and are pivotally connected together by pins 141. (FIG. 4). The above described C-shaped clevice 130 comprises one of the two components of the second hook carrier 116.

The second component of hook carrier 116 is comprised of a compound clevice 142 (FIG. 4A) which has a normally vertically extending base wall 144. A pair of tabs 146 dwell in a horizontal plane and extend towards the tabs 134 and 136 on clevice 130. Tabs 146 slidably and pivotally fit within the tabs 134 and 136 on clevice 130. A second pair of tabs 148 dwell in a vertical plane and extend from base wall 144 in a direction opposite to that of tabs 146.

Again, the upper ends of all of the shanks 94 are rigidly secured to the centers of lateral extending bars 128 or 138. The upper ends of the shanks extend through suitable apertures in the lower tab member of the hook carriers 114 and 116. It is important to note that there are bearings 150 on the upper ends of the shanks only which depend from the second hook carrier 116 and not the hook carrier 114. It should also be noted that the hooks 90 in the embodiment in FIGS. 4–7 are much closer together than are the hook elements in the prior art device of FIGS. 1 through 3.

In the normal operation of the device of this invention, (FIG. 14) the loops of the sausage strand are created as the hooks 90 intercept the links 30 at predetermined points. The loops 32 are carried into the entry door 36 and are subjected to a shower of smoke generally located at the end 152 of compartment 34. The general area designated by the numeral 154 represents the area where the sausage loops are permitted to dry or at least lose some of the excess liquid smoke imposed upon the loops.

The path of the loops through the compartment 34 is best shown by the dotted lines in FIG. 13. As soon as the loops enter the door 36, their direction is reversed as the chain 88 moves around sprocket 50 and back towards the sprocket 52. The direction of the chain is thereupon reversed and the loops are moved back towards the sprocket 46. Upon departing sprocket 46 the chain moves then towards the sprocket 48 which moves the chain through the exit opening 38 towards the rotatable member 58. The member 58 moves the chain vertically upward and back towards a place of beginning to rotatable member 60. When in the last phase of this path, the chain moves on chain guide 42 on the outside of the compartment 34 as shown in FIG. 14.

The device for imparting liquid smoke or natural smoke to the length of chain in the area 152 has not been shown for this is conventional and does not per se comprise a part of this invention.

From the foregoing, it is seen that the closely located hooks 90 will substantially increase the volume or density of loops that can be treated in the smoke compartment 34 through one pass of the chain 88. Further, since the sprockets 42 through 48 are substantially spaced and engage the roller bearings 150 which are mounted only on every other hook, the chain 88 is easily moved from one plane to another within the compartment 34.

It is therefore seen that this invention will achieve at least all of its stated objectives.

What is claimed is:

1. A conveyor chain, comprising, a plurality of spaced first hook carriers with second hook carriers pivotally connected thereto between pairs of said first hook carriers, the first hook carriers being rigid and the second hook carriers being jointed;

a generally J-shaped hook having an elongated shank secured to each of said first and second hook carriers by one of the ends of said shank, and a roller bearing rotatably mounted on said one end of said shank on only the shanks depending from said second hook carriers to engage teeth of a sprocket wheel spaced to operatively drivingly engage only the shanks depending from said second hook carriers.

2. The conveyor chain of claim 1 wherein the shanks depending from each of said first hook carriers are rigidly secured to said first hook carriers.

3. The conveyor chain of claim 1 wherein each of the first and second hook carriers includes first and second pairs of tabs, with the first pair of tabs extending oppositely from the second pair of tabs, and all the tabs of the first and second pairs of tabs of the first and second hook carriers being in vertical planes.

4. The conveyor chain of claim 1 wherein the pivotal connection between each carrier is about a horizontal axis.

5. The conveyor chain of claim 1 wherein each of the second hook carriers include opposite ends with a horizontal pivot axis therein and a vertical pivot axis between the horizontal pivot axes.

6. The device of claim 1 wherein said conveyor chain system is enclosed within a sausage smoke compartment.

7. The conveyor chain of claim 1 wherein each of the second hook carriers includes opposite ends, with each end being pivotally connected to an adjacent first hook carrier about a horizontal axis.

8. The conveyor chain of claim 7 wherein each of the second hook carriers includes a pair of clevises pivotally connected about a vertical axis.

9. The conveyor of claim 1 wherein said first hook carriers are each comprised of a U-shaped member having spaced pairs of tabs extending longitudinally in opposite directions thereof, with each pair of tabs being pivotally secured about laterally extending axes to one of said second hook carriers.

10. The conveyor chain of claim 9 wherein said second hook carriers are each comprised of a pair of clevice members pivotally secured to each other and each secured to a shank depending from the second hook carrier, with each of said clevice members being pivotally secured to an adjacent first hook carrier about a laterally extending axis.

11. The conveyor chain of claim 10 wherein a laterally extending bar is secured to said one end of each of said shanks.

12. The conveyor chain of claim 10 wherein the shanks depending from each of said second hook carriers are rigidly secured to one of said clevice members.

13. A conveyor system, comprising:

a frame, a series of spaced rotatable members on said frame, a continuous conveyor chain extending around said rotatable members, power means on said frame for rotating at least one of said rotatable members to movingly drive said chain, said chain comprising a plurality of spaced first hook carriers with second hook carriers pivotally secured thereto between pairs of said first hook carriers, with successive first and second hook carriers defining a pair of carriers having only a single vertical pivot axis;

a generally J-shaped hook having an elongated shank secured to each of said first and second hook carriers by one of the ends of said shank, at least one of said rotatable members being a sprocket having radially extending spaced teeth, said teeth being so spaced to operatively drivingly engage only the shanks depending from said second hook carriers.

14. The conveyor chain of claim 13 wherein each of the second hook carriers each include a pivot axis perpendicular to the pivot axis between the first and second hook carriers.

15. The device of claim 13 wherein said conveyor system is enclosed within a sausage smoke compartment.

16. The conveyor system of claim 13 wherein said sprocket is disposed in a plane at right angles to a longitudinal axes of said shanks.

17. The conveyor system of claim 16 wherein a laterally extending bar is secured to said one end of each of said shanks, at least one of said rotatable members having a circular bearing surface extending around an outer periphery thereof, said chain extending partially around said bearing surface with said laterally extending bars engaging said bearing surface.

18. The conveyor system of claim 17 wherein said bearing surface rotates about a horizontal axis.

19. The conveyor system of claim 17 wherein said circular bearing surface is rotatable around a horizontal axis.

20. The conveyor system of claim 19 wherein said circular bearing surface is rotatable around a horizontal axis and the plane of said rotatable member is in a vertical position.

21. The conveyor system of claim 20 wherein said rotatable members include two of said bearing surfaces in a vertical plane, and include four of said sprockets in a horizontal plane.

* * * * *